United States Patent

[11] 3,568,691

| [72] | Inventors | Richard B. Kennedy<br>Ridgefield, Conn.;<br>Alfred B. Huston, Homewood, Ill.; Owen H.<br>Griswold, Westwood, N.J. |
|---|---|---|
| [21] | Appl. No. | 727,289 |
| [22] | Filed | May 7, 1968 |
| [45] | Patented | Mar. 9, 1971 |
| [73] | Assignee | Better Built Machinery Corporation<br>New York, N.Y. |

[54] WASHING CART AND MEANS FOR CONTROL THEREOF
16 Claims, 8 Drawing Figs.

[52] U.S. Cl. ................................................. 134/144,
134/145, 134/165, 285/325
[51] Int. Cl. .................................................. B08b 3/02,
B08b 9/00
[50] Field of Search............................................ 134/82,
144, 145, 146, 148, 155, 165, 167, 171, 172;
285/325, 103; 141/(Inquired); 68/5.3; 312/115;
211/127

[56] References Cited
UNITED STATES PATENTS

| 323,317 | 7/1885 | Goodrich et al. | 285/325 |
| 495,329 | 4/1893 | Harman | 134/148 |
| 614,888 | 11/1898 | Poetz | 285/325X |
| 1,937,738 | 12/1933 | Walker | 211/127UX |
| 2,207,452 | 7/1940 | Bingman | 134/165X |
| 2,225,946 | 12/1940 | Arey | 134/145X |
| 2,786,480 | 3/1957 | Hofer | 134/171 |
| 3,009,470 | 11/1961 | Zurek | 134/144X |
| 3,017,892 | 1/1962 | Mixon | 134/144X |
| 3,207,167 | 9/1965 | Edstrom | 134/144 |
| 3,463,173 | 8/1969 | Goldman | 134/145 |

FOREIGN PATENTS

| 1,350,361 | 12/1963 | France | 285/325 |
| 368,278 | 5/1963 | Switzerland | 134/165 |

Primary Examiner—Daniel Blum
Attorney—J. B. Felshin

ABSTRACT: The cart or transport vehicle is moved across the floor or along other means of transport, such as conveyors or overhead monorail, into a washer chamber, and has means for attachment to a fluid connection in the chamber, through which washing and/or rinsing fluid is coupled to spray devices on the cart for washing a load of items placed on the cart. The cart is equipped with a drip pan that drains while the cart is within the washing chamber but which retains drippage from the washed load when the cart is removed from the washing chamber, to minimize wetting hazards of the floor over which the cart is to be moved when removed from the chamber. A fluid connection between the cart and a fluid supply within the chamber is so designed that no thrust is transmitted to the cart and the connection is automatically sealed by the fluid pressure.

INVENTORS
RICHARD B. KENNEDY
ALFRED B. HUSTON
OWEN H. GRISWOLD
BY J.B. Felshin
ATTORNEY.

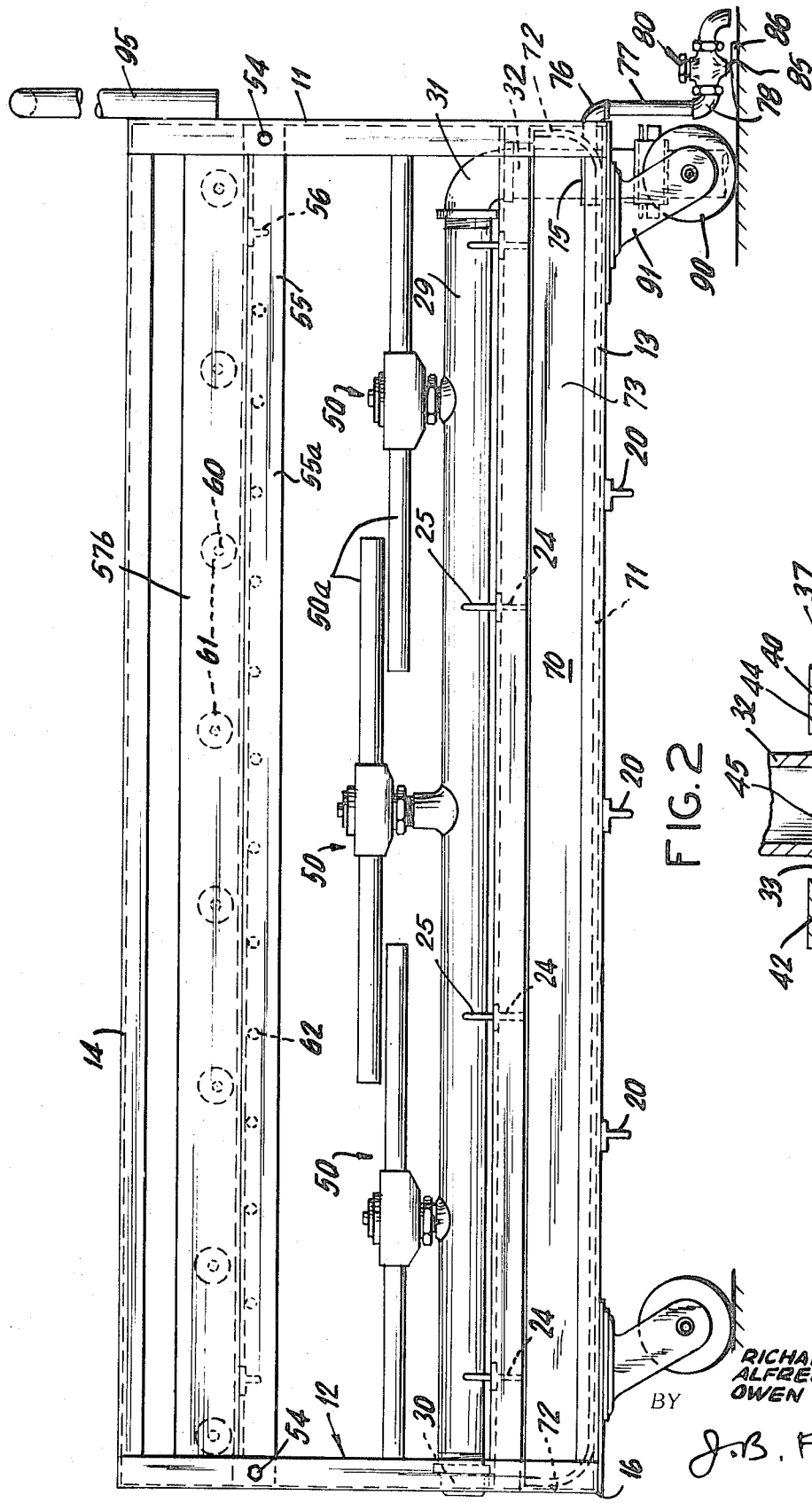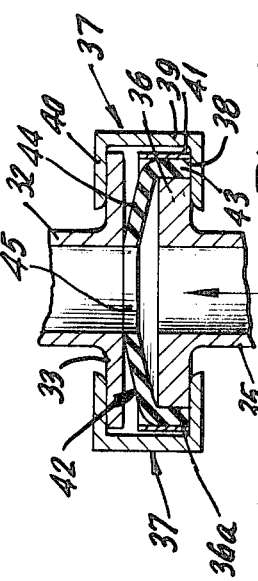

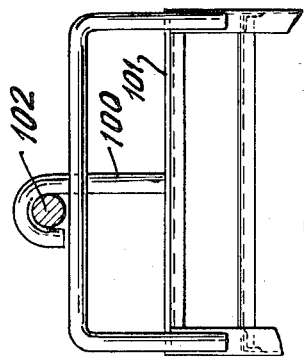
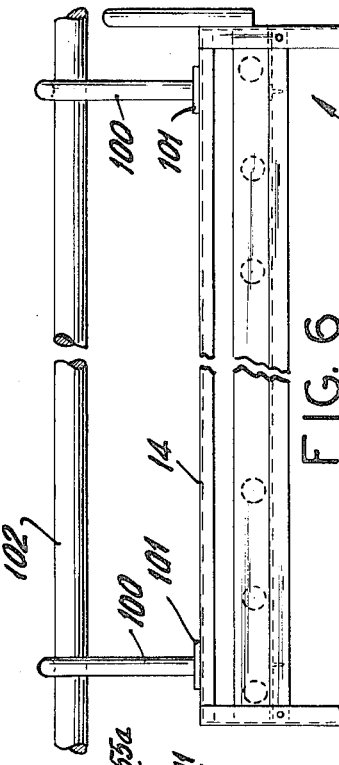
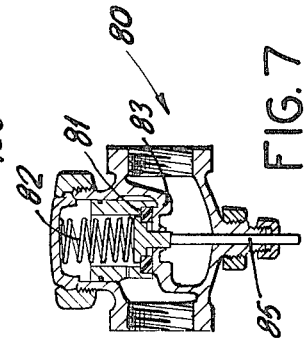
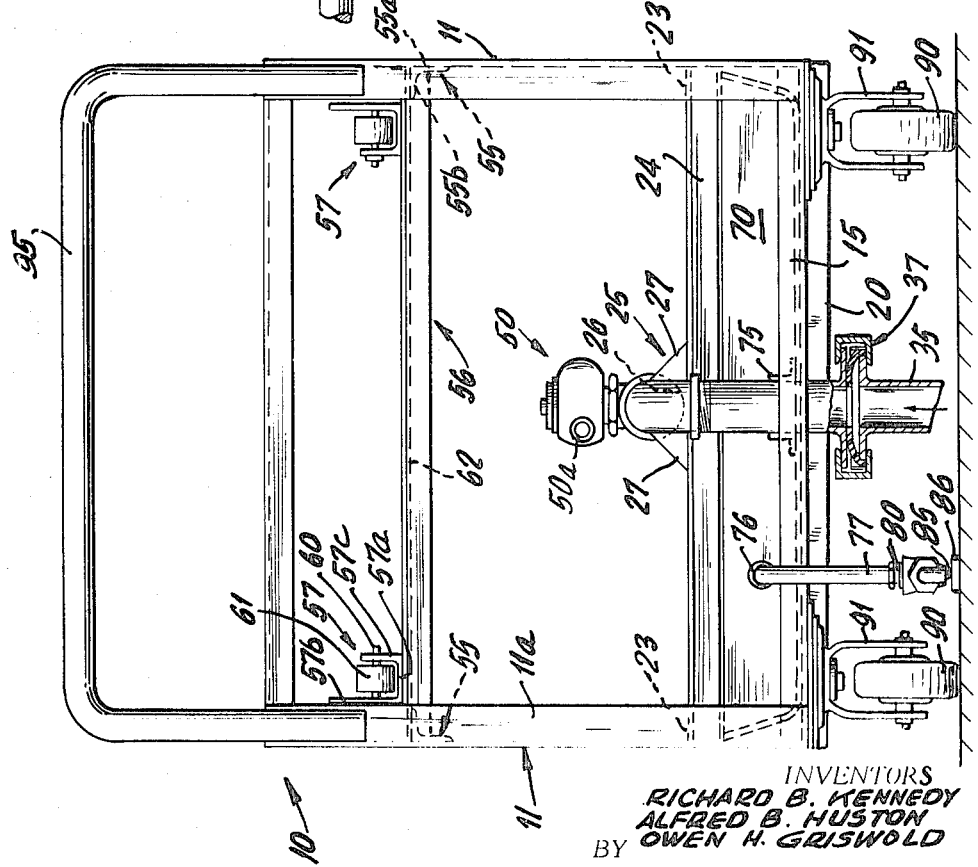

INVENTORS
RICHARD B. KENNEDY
ALFRED B. HUSTON
OWEN H. GRISWOLD
BY J.B. Felshin
ATTORNEY

WASHING CART AND MEANS FOR CONTROL THEREOF

BACKGROUND OF THE INVENTION

1. Field of the Invention

This invention relates to devices for washing articles and equipment used in hospitals and other articles with fluid sprays. It is particularly directed to a system of washing wherein a cart or transport vehicle normally moved across the floor or along other means of transport such as conveyors or overhead monorail is positioned in a chamber so as to be attached to a fluid connection through which washing and/or rinsing fluid may be connected to the cart or vehicle. The cart or vehicle is equipped with nozzles or spraying devices in such a manner as to wash a load of items placed on that cart.

2. Description of the Prior Art

Washers are known in which a tray on wheels is mounted on tracks on the door of the washer and moved into the washing chamber, and in which, after the door is closed, articles on the tray are washed by water from spray devices or nozzles on the tray. Washers are also known in which animal cages or other articles to be washed are moved into a washing chamber which is thereafter closed, and spray devices on the washer then spray such articles to wash them.

SUMMARY OF THE INVENTION

An object of this invention is to provide a cart on which articles to be washed are placed, such cart being constructed to be moved on a floor or conveyor or monorail directly into the chamber of a washer, and said cart being provided with spray means connectable to a fluid supply within the chamber for spray-washing the articles on the cart.

Another object of this invention is to provide in a cart of the character described, a drip pan, and means to drain said pan while the cart is within the chamber and to automatically stop the drainage of the pan when the cart is removed from said chamber.

Still another object of this invention is to provide a cart of the character described and also means to couple the spray devices on the cart to a water supply within said chamber, said coupling means being such that no thrust is transmitted to the cart, and the pressure of the fluid supply causes automatic sealing of the coupling to prevent leakage.

Yet another object of this invention is to provide a strong, rugged and durable cart of the character described which shall be relatively inexpensive to manufacture, which shall be easy to manipulate and handle, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE DRAWING

In the accompanying drawing, in which are shown various illustrative embodiments of this invention:

FIG. 2 is a side elevational view thereof;

FIG. 3 is a front end view thereof, with parts in cross section;

FIG. 4 is a vertical cross-sectional view of the fluid coupling for the cart;

FIG. 5 is a partial end view of the cart illustrating a modified construction;

FIG. 6 is a side elevational view of the structure of FIG. 5;

FIG. 7 is a longitudinal cross-sectional sectional view of the self-closing valve.

DESCRIPTION OF THE PREFERRED EMBODIMENTS

Figure 1:
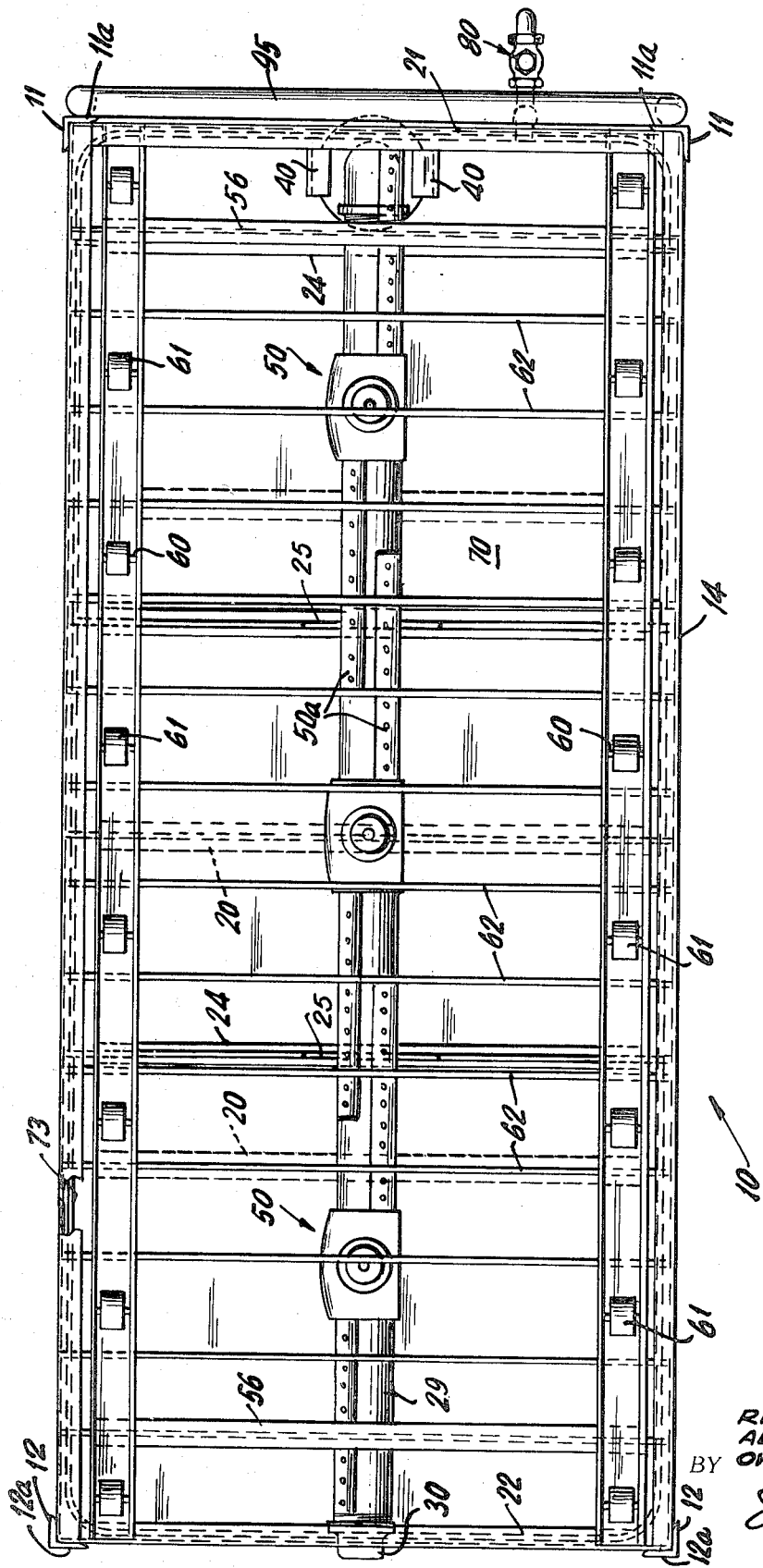
FIG. 1 is a top plan view of a cart with controls therefor, embodying the invention.

Referring now in detail to the drawing, 10 designates a cart or vehicle embodying the invention. Said cart comprises a pair of front vertical angle-shaped cornerposts 11 aligned with a pair of rear vertical angle-shaped cornerposts 12 coextensive with posts 11. The front cornerposts are fixed to the rear cornerposts by horizontal, longitudinal lower angle-shaped members 13 and by horizontal, longitudinal upper angle-shaped members 14. The front cornerposts 11 are interconnected by lower transverse horizontal angle-shaped members 15, and the rear corner posts are interconnected by transverse horizontal angle-shaped members 16. These angle-shaped members are all welded together or otherwise secured together rigidly. The lower members 13 may be reinforced by a plurality of transverse members 20 of T-shaped cross section.

The upper ends of said front cornerposts 11 are connected by a transverse member 21 of angle-shaped cross section. The upper ends of rear cornerposts 12 are interconnected by a transverse member 21 of angle-shaped cross section The upper ends of rear cornerposts 12 are interconnected by transverse members 22 of angle-shaped cross section.

The front and rear cornerposts are interconnected, several inches above their lower ends, by longitudinal members 23 of angle-shaped cross section similar to members 13. Angle members 13 are interconnected by four transverse equally spaced T-shaped members 24.

Mounted on each T-shaped member 24 is a central vertical plate 25 formed at its upper end with a semicircular notch 26 for the purpose hereinafter appearing. Plates 25 each have downwardly diverging upper edges 27. Plates 25 are welded in place. Mounted on said plates and received in the semicircular notches 26, is a horizontal manifold pipe 29 extending longitudinally of the cart. A cap 30 closes the rear end of the manifold pipe. Attached to the front end of pipe 29 is an elbow fitting 31 to which is attached a vertical downwardly extending pipe 32 projecting below the angle members 13, 15, 16.

At the lower end of pipe 32 is an annular flange 33 (FIG. 4) for coupling with a fixed water supply pipe 35 disposed within the washer chamber into which the cart is to be moved for a washing operation. Pipe 35 has an annular flange 36 at its upper end spaced from and disposed below flange 33. Fixed to opposite sides of flange 36 are a pair of parallel, longitudinal, short, similar, symmetrically disposed inwardly opening channel-shaped members 37. Each member 37 has a lower flange 38 welded or otherwise secured to the underside of flange 36, a vertical web 39 extending upwardly from flange 38, and a flange 40 parallel to and disposed above said flange 36. As the cart is moved into the washing machine, annular flange 33 slides beneath flanges 40 as it approaches its operating position within the washing machine.

Attached to the outer rim edge 36a of flange 36, by means of a clamp ring 41, is a flexible, rubberlike gasket 42. Gasket 42 has an outer portion 43 disposed between the clamp 41 and rim edge 36a, and an annular portion 44 loosely overlying the upper surface of flange 36 and disposed at the underside of flange 33. Gasket portion 44 has a central hole 45 registering with aligned pipes 32, 35. Clamp ring 41 may comprise a usual hose clamp.

When the cart is in place within the washing chamber, and water under pressure is turned "on" to pipe 35, the pressure of the water will press gasket portion 44 upwardly against the underside of flange 33, as shown in FIG. 3, to seal the coupling connection.

It will be noted that the thrust of the water is taken up by channels 37 which are fixed to the fixed pipe 35, and that no thrust is transmitted to the cart, thereby preventing possibility of the cart being raised up or moved out of place by water pressure.

Rotatably mounted on the manifold pipe 29 are a plurality of twirlers 50. These may be of the self-propelling type disclosed in U.S. Pat. No. 3,277,907, or of any other well-known type wherein the pressure of the water causes rotation of the twirler. Said twirlers are equally spaced apart and each has outwardly extending arms 50a. The arms 50a of the central twirler may be disposed above and overlap arms of the other two twirlers. The arms of the twirlers have openings located to spray water upwardly.

Supported on bolts 54 mounted in the cornerposts 11, 12, and above the twirlers, are a pair of longitudinal, horizontal coplanar angle-shaped members 55 to which are welded a plurality of T-shaped, transverse horizontal members 56.

Angle-shaped members 55 each has a vertical outer flange 55a from which a horizontal flange 55b extends inwardly.

Supported on the T-shaped members 56, adjacent the opposite sides of the cart are a pair of similar, symmetrically disposed channel-shaped members 57. Said members 55, 56, 57 are disposed above the twirlers, but below the upper ends of the cornerposts. Each channel-shaped member 57 comprises a lower horizontal web 57a from which extends upwardly, an outer taller flange 57b substantially in the plane of the inner edges of flanges 11a, 12a of the cornerposts 11, 12. Also extending up from webs 57a are shorter inner flanges 57c. Supported by flanges 57b, 57c are a plurality of cross pins 60 carrying rollers 61 disposed in the channels of said members 57. The rollers 61 project somewhat above the upper edges of flanges 57c.

A plurality of transverse, coplanar horizontal cross rods 62 are supported by flanges 55a of angle-shaped members 55 and located just below the level of the heads of T-shaped members 56.

Trays, bedpans or other hospital articles or other things to be washed may be mounted on the cart by rolling them on the rollers 61 or by placing them on the rods 62, so as to be located above the twirlers 50 to be washed by sprays therefrom.

Mounted on the T-shaped members 24 is a drip pan 70 extending the length of the cart. Said pan has a bottom wall 71 from which extend upwardly, end walls 72 connected to sidewalls 73.

The pipe 32 passes through a suitable hole in the bottom wall 71 and is welded to a ring 75 which in turn is welded to the bottom wall, to prevent leakage.

Fixed to the leading end wall 72 of the drip pan is an offset elbow pipefitting 76 to which is fixed a vertical, downwardly extending pipe 77 connected by an elbow 78 to a quick-opening, self-closing valve 80. This valve may comprise a bronze globe valve.

The globe valve 80 may comprise a valve plate 81 pressed by a coil compression spring 82 down against an annular valve seat 83 to shut the flow of water. Valve plate 81 has a downwardly extending valve pin or stem 85 projecting down below the valve casing. A cam 86 is so fixed and placed in the washing chamber that when the cart is wholly within the chamber and in position for washing, said cam raises pin 85 to open the valve. Thus the drip pan empties while the cart is in the washing chamber during the washing operation. As soon as the cart is pulled out of the washing chamber, pin 85 moves off cam 86 and the valve closes so that the drip pan stops draining or emptying, whereby not to wet the floor as the cart moves from the washing machine to wherever it is being moved. The cart is supported on wheels 90 mounted on brackets 91 attached beneath the four corners of the cart.

A handle 95 may be fixed to the upper end of the front corner posts for pushing or pulling the cart.

In FIGS. 5 and 6 there is shown a cart 109 similar to cart 10 except that hooks 100 are supported on crossbars 101 welded to the upper longitudinal members 14. Said hooks may engage a monorail 102 for transporting the cart.

Also the cart may be transported on a conveyor (not shown) if desired.

Figure 8:
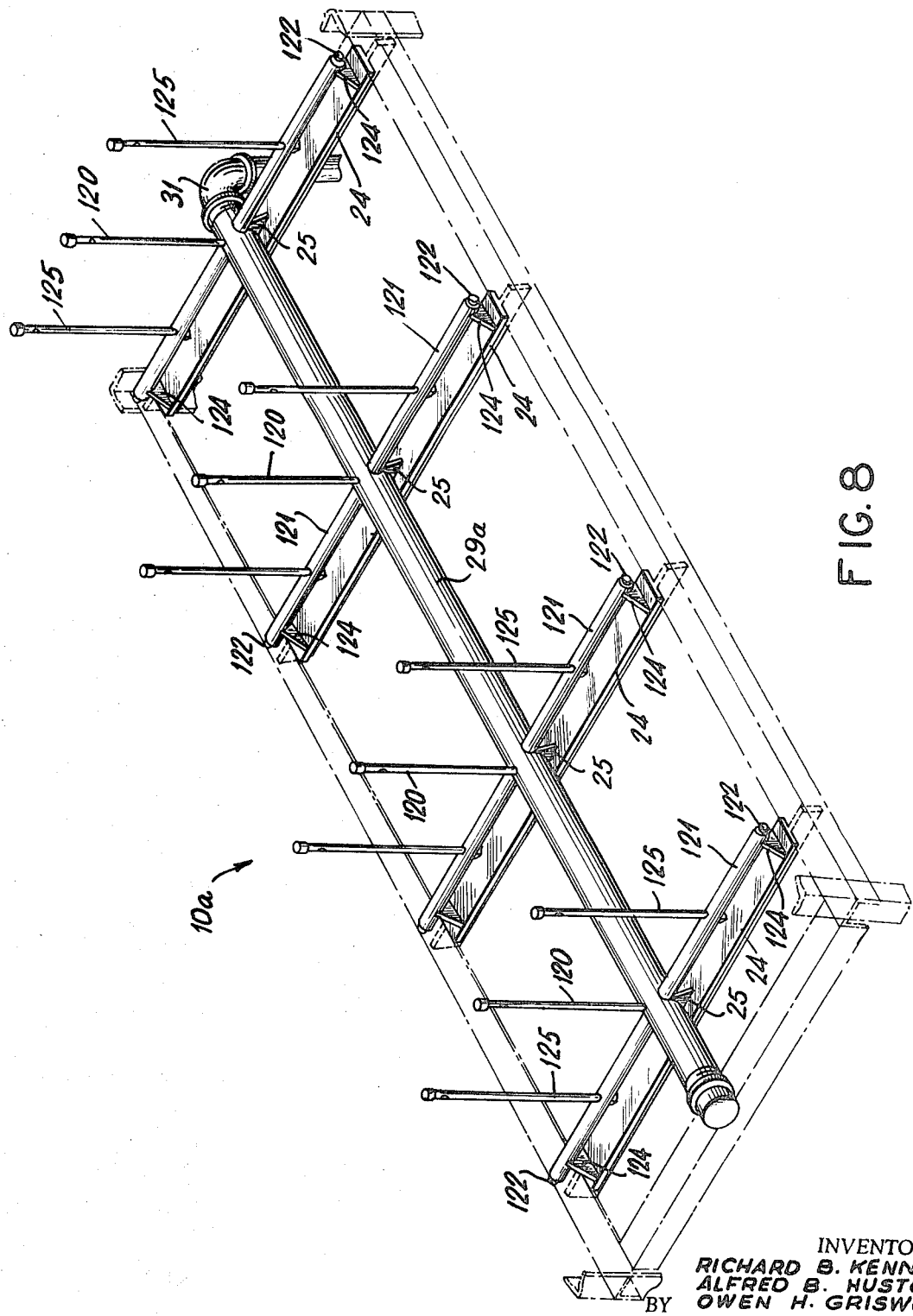
FIG. 8 is a perspective view illustrating a modified construction.

In FIG. 8 there is shown a partial view of a cart 10a illustrating a modified construction. Cart 10a is similar to cart 10 except for differences explained hereinafter.

Cart 10a has a manifold pipe 29a similar to pipe 29, similarly mounted, similarly connected by elbow fitting 31 to vertical pipe 32 which is connected by coupling means shown in FIG. 4 to the water supply pipe 35.

Pipe 29a is likewise supported on members 25 resting on the midportions of T-shaped crossmembers 24, same as in cart 10.

Attached to the manifold pipe 29a are a plurality of vertical tubular spindles 120 to spray water upwardly. Said spindles 120 communicate with the manifold pipe and may be spaced like the T-shaped members 24 or otherwise distributed. Fixed to opposite sides of manifold pipe 29a and communicating therewith are pairs of aligned, oppositely extending horizontal branch pipes 121 closed at their outer ends, as by caps or plugs 122, and supported adjacent their outer ends by small vertical webs 124 fixed on the T-shaped transverse members 24.

Vertical spindles 125 are mounted on said branch pipes 121 for spraying water upwardly for washing a wash load.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative and not in a limiting sense.

We claim:

1. A cart, means to support said cart for transportation into a washing chamber of a washing machine, means on the cart to spray water upwardly, means on the cart to support articles to be washed by said spray means, said article support means being disposed above said spray means, a drip pan on the cart and below said spray means to receive drippage from articles on the cart, being washed, outlet means connected to the drip pan to allow water in the drip pan to flow out of said pan, and normally closed valve means in said outlet means, and fixed means independent of the cart, to open said valve means.

2. The combination of claim 1, said spray means including a manifold pipe having an inlet end, a fixed water supply means, and means to automatically couple said inlet end of the manifold pipe to said fixed water supply means upon moving said inlet relative to said fixed water supply means.

3. The combination of claim 2, said coupling means including means fixed to said water supply means, to take up thrust of water pressure when water is supplied under pressure from said water supply means to said manifold pipe through said coupling means.

4. The combination of claim 3, said coupling means including means to automatically seal the coupling means when water under pressure passes through said coupling means.

5. The combination of claim 3, said thrust takeup means comprising a pair of parallel, channel-shaped members having inwardly opening channels, and fixed to said water supply means, a said manifold pipe having a flange adapted to engage within said inwardly opening channels.

6. The combination of claim 5, and a gasket attached to said water supply means and disposed between said channel-shaped members and having an opening to allow water to pass from said water supply means to said manifold pipe, and said gasket being pressed against the underside of said flange when water under pressure passes from said water supply means through said opening in said gasket and into said manifold pipe.

7. The combination of claim 4, said thrust takeup means comprising a pair of parallel, channel-shaped members having inwardly opening channels, and fixed to said water supply means, said manifold pipe having a flange adapted to engage within said inwardly opening channels, and said automatic sealing means comprising a gasket attached to said water supply means and disposed between said channel-shaped members and having an opening to allow water to pass from said water supply means to said manifold pipe, and said gasket being pressed against the underside of said flange when water under pressure passes from said water supply means through said opening in said gasket and into said manifold pipe.

8. A cart, means to support said cart for transportation into a washing chamber of a washing machine, means on the cart to spray water upwardly, means on the cart to support articles to be washed by said spray means, said article support means being disposed above said spray means, a drip pan on the cart and below said spray means to receive drippage from articles on the cart, being washed, outlet means connected to the drip pan to allow water in the drip pan to flow out of said pan, said means to open said valve means comprising a fixed cam and means on said valve means engageable with said cam to open said valve means.

9. The combination of claim 1, said article support means comprising a pair of upwardly opening channels at the sides of said cart, and rollers supported in said channels.

10. The combination of claim 9, and a plurality of spaced parallel rods mounted on said cart in a common plane below said channels.

11. In combination, means to receive water, said means having an inlet end, water supply means having an outlet end, means to disengageably couple said inlet end to said outlet end coaxially, said coupling means including means fixed to one of said ends to take up thrust of water pressure in said coaxial direction when water is supplied under pressure from said water supply means to said water receiving means through said coupling means, to prevent relative movement of said water receiving means and water supply means away from each other in the direction of thrust, a member to support said water receiving means, said member having means to support articles to be washed, means on said water receiving means to apply water to said supported articles, to wash said articles, one of said ends being fixed and one being movable in a direction at right angles to the axis of the coupled ends.

12. The combination of claim 11, said member being movable in a direction at right angles to said direction of thrust, said coupling means comprising a coupling member fixed to said fixed means and a coupling member fixed to said movable means, and said coupling members having mutually slidably engaging portions.

13. The combination of claim 11, said coupling means including means to automatically seal the coupling means when water under pressure passes through said coupling means.

14. The combination of claim 11, said thrust takeup means comprising a pair of parallel, channel members having inwardly opening channels, and fixed to one of said two first-mentioned means and the other of said two first-mentioned means having a flange adapted to slidably engage within said inwardly opening channels.

15. The combination of claim 11, said thrust takeup means comprising means at said outlet end fixed to said water supply means and forming a pair of inwardly opening channels, and means at said inlet end, fixed to said water-receiving means, slidably engaged within said channels.

16. The combination of claim 15, said water supply means including a flange fixed thereto and disposed between said channels, and a gasket attached to the flange of said water supply means and disposed between said channels and being formed with an opening communicating with said outlet and inlet, said gasket being pressed against said slidably engaged means when water under pressure passes from said water supply means through said opening in said gasket and into said water-receiving means.